Sept. 27, 1960 W. F. JACKSON ET AL 2,953,937
CONTROL DEVICE

Filed Aug. 2, 1956 2 Sheets-Sheet 1

INVENTORS.
Wilbur F. Jackson and Theodore J. Dykzeul.
BY
*Albert J. Henderson*
THEIR ATTORNEY.

2,953,937
Patented Sept. 27, 1960

United States Patent Office

2,953,937
CONTROL DEVICE

Wilbur F. Jackson and Theodore J. Dykzeul, Compton, Calif., assignors to Robertshaw-Fulton Controls Company, Richmond, Va., a corporation of Delaware Filed Aug. 2, 1956, Ser. No. 601,802

6 Claims. (Cl. 74—504)

This invention relates to control devices which are manually adjustable and more particularly to the adjustment and calibration means in a control device including a thermostatically controlled valve and a rotary shut-off cock.

It is an object of this invention to adjust the limit of rotation of a shut-off cock and thereby adjust the capacity of the same when in its "on" position.

Another object of this invention is to produce an approved calibrating means and adjustment means for a thermostatic valve.

Another object of this invention is to mount a manually operable dial and an operating shaft for the thermostatic valve whereby the same will be substantially unaffected by accidental blows or forces.

In one preferred embodiment of the invention a shut-off cock and thermostatic valve are mounted within a casing for controlling the flow of fluid through the casing. The shut-off cock is movable from an "off" position through a predetermined range of increasing capacity in an "on" position. A manually operable dial is carried by the shut-off cock and provided with an abutment which is engageable with an adjustable stop on the casing. The stop is adjustable to limit movement of the cock within the said predetermined range thereby to vary the capacity of the cock in the full "on" position thereof.

The thermostatic valve is provided with manually operable adjusting means for effecting different temperature settings. This means takes the form of a rotatable shaft threaded in the casing and having one end operatively connected to the thermostatic valve and the other end thereof extending exteriorly of the casing. A rotatable dial is carried by the exterior end of the shaft and is positioned in close proximity to the exterior surface of the casing and frictionally engages a plurality of projections formed on said casing. Yieldable means are provided for holding the dial to the shaft and serve to bias the dial into engagement with the projections. Adjustable calibrating means are provided for varying the angular position of the dial relative to the shaft.

Figure 1:
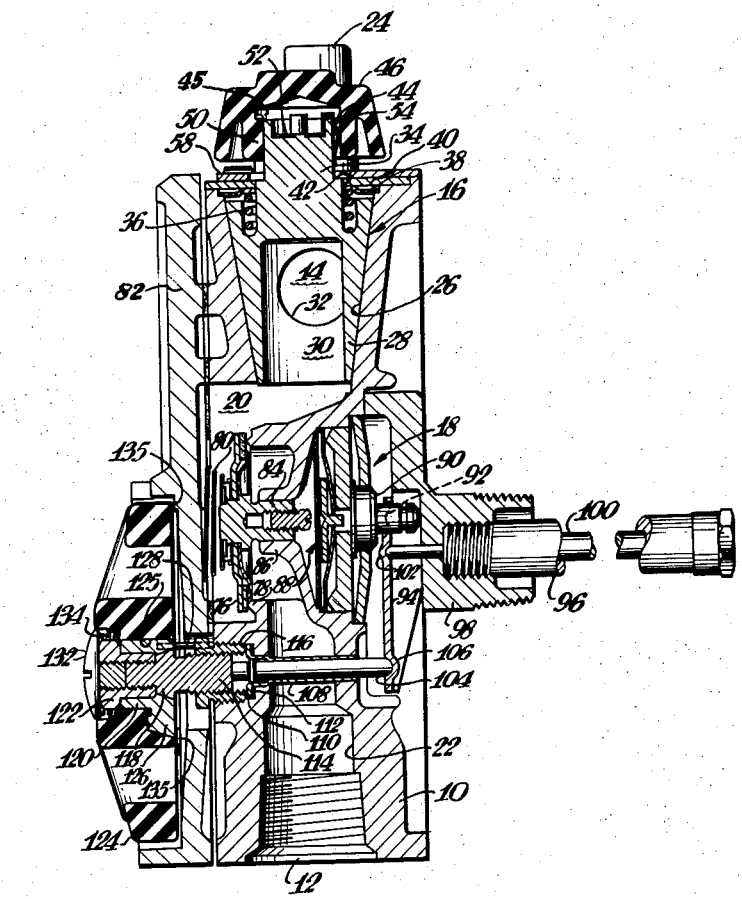
Figure 2:
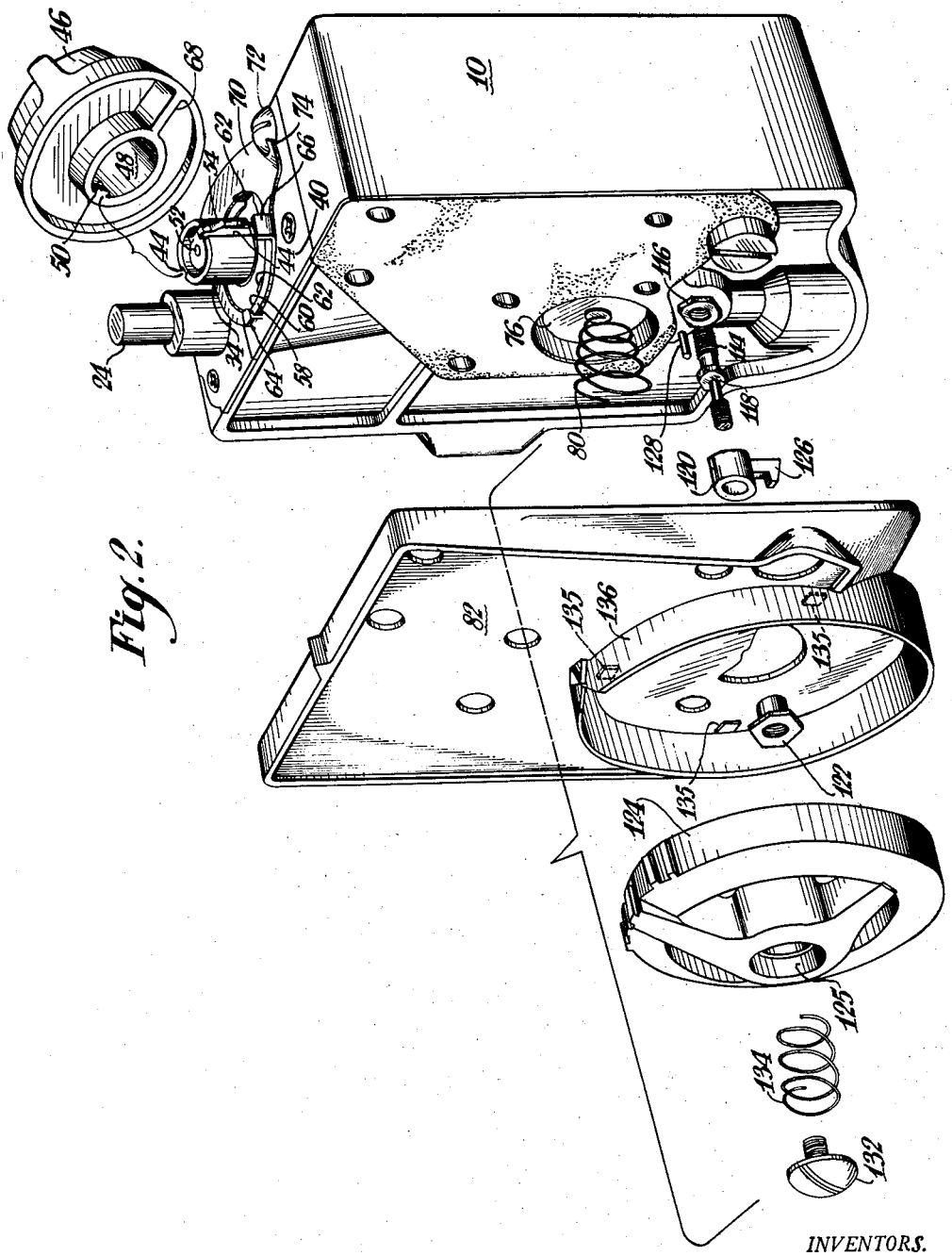

Other objects and advantages will become apparent from the following description taken in connection with the accompanying drawings wherein:

Fig. 1 is a longitudinal section of a control device embodying this invention; and Fig. 2 is an exploded perspective view of parts of the control device.

Referring more particularly to Fig. 1, the control device comprises a casing 10 provided with an inlet (not shown) and an outlet 12 for supplying fuel to a main burner. A fuel passage 14 in the casing 10 provides communication between the inlet (not shown) and a manually operable valve indicated generally by the reference numeral 16. A thermostatic valve indicated generally by the reference numeral 18 is positioned in a chamber 20 which communicates with the valve 16 and a passage 22 which leads to the outlet 12. As is customary in such devices, a safety valve (not shown) is positioned in the passage 14 between the valve 16 and the inlet. The safety valve may be responsive to a flame at a pilot burner and provided with a manually operable resetting button 24 which projects exteriorly of the casing 10.

Manually operative valve

Referring more particularly to the manually operable valve 16, a conical bore 26 is provided in the upper part of the casing 10 and positioned so as to have the main fuel passage 14 opening into the side thereof and continuing out of the bottom thereof. A plug valve member or shut-off cock 28, of generally conical configuration and having a cylindrical bore 30 in the lower portion thereof, is seated in the conical bore 26 and is adapted for turning movement therewithin. A circular opening 32 is provided in the wall of the plug valve member 28 and is adapted to allow communication between the passage 14 and the interior of the plug valve 28.

In the position shown, wherein the plug valve member 28 is turned to align the opening 32 with the passage 14, fuel will flow through the opening 32 into the cylindrical bore 30 of the plug valve member 28 and out of the open bottom thereof to the thermostatic valve 18. However, should the plug valve member 28 be rotated clockwise from the position shown in Fig. 1, the opening 32 will face the wall of the conical bore 26 and flow of fuel will be prevented through the passage 14. It will be apparent that when the plug valve member 28 is rotated from the "off" position to the "on" position shown in Fig. 1, the plug valve member 28 will move through a substantial range of movement from the time the opening 32 first communicates with the passage 14 until the opening 32 is aligned with the passage 14, as shown in Fig. 1.

The plug valve member 28 is provided with a generally cylindrical end portion 34 which projects exteriorly of the casing 10. A spring 36 encircles the end portion 34 and is mounted in compression between a recess formed in the valve member 28 and a washer 38. The washer 38 is biased by the spring 36 into engagement with a cover plate 40 which is attached to the end of the casing 10. The end portion 34 projects through an opening 42 in the cover plate 40 and is provided with suitable slots 44 (Fig. 2) by means of which a manually operable dial 46 is attached to the end of the portion 34. As shown more clearly in Fig. 2, the dial 46 is provided with a cylindrical bore 48 for receiving the end portion 34 and an abutment 50 within the bore 48 for cooperation with one of the slots 44 and to key the dial 46 to the end portion 34. A washer 52 having an extending spring portion 54 is fixed to the end of the portion 34 whereby the spring portion 54 is cooperable with the slot 44 to create a biasing force on the dial 46 which tends to hold the same into engagement with the portion 34. It will be apparent that rotation of the dial 46 will effect rotation of the plug valve member 28 between open and closed positions.

It has been customary in such devices to provide visual indication of the "on" and "off" positions of the shut-off cock. To this end, the cover plate 40 may be provided with a suitable index (not shown) for cooperation with suitable indicia (not shown) on the dial 46. Also, the washer 38 may be utilized to provide a stop (not shown) for preventing rotation of the dial 46 beyond the "on" or "off" position of the cock 28. With such means, clockwise rotation of the valve member 28 will be prevented when the opening 32 faces the wall of the tapered seat 26 in the "off" position and counterclockwise rotation of the valve member 28 will be prevented when the opening 32 is aligned with the passage 14.

It has been found that the flow of fuel permitted when the opening 32 is aligned with the passage 14 sometimes exceeds the capacity of the burner which the device controls. Accordingly, means are provided in this invention for limiting the capacity of the valve 16 in the "on" position thereof. Referring to Fig. 2, a generally circular disc 58 is rotatably mounted on the cover plate 40 and provided with a central bore 60 through which the end portion 34 projects in axial alignment therewith. Three spaced lugs 62, 62 (two of which are visible in Fig. 2) project from the cover plate 40 and engage the edges of the bore 60. Another lug 64 projects from the cover plate 40 and engages the periphery of the disc 58. A portion of the lug 64 is bent over the edge of the disc 58 to thereby prevent displacement of the same relative to the cover plate 40. The lugs 62, 64 are angularly spaced from the center of the bore 60 and thereby guide the disc 58 for rotation about the longitudinal axis of the bore 60 and the portion 34.

The disc 58 is provided with an upturned lug or stop 66 on the periphery thereof which is adapted to be engaged by an abutment 68 formed on the underside of the dial 46 during rotation of the dial 46. The stop 66 is preferably positioned to be engageable by the abutment 68 during movement of the valve 28 between the position wherein the opening 32 moves into communication with the passage 14 and a position wherein the opening 32 is in axial alignment with the passage 14.

To enable adjustment of the angular position of the stop 66 and the disc 58, the disc 58 is provided with a coplanar integral portion 70 extending from a portion of the periphery thereof adjacent the stop 66. A screw 72 extends through the cover plate 40 and is threaded into casing 10 in a position whereby a portion of the head thereof will overlie the edge of the portion 70 and clamp the same into rigid engagement with the cover plate 40 when the screw 72 is tightened. The outer edge of the portion 70 is generally curved and has the same center of curvature as the disc 58 whereby the head of the screw 72 will overlie the edge of the portion 70 over its arcuate length.

The portion 70 is provided with an upwardly bent lug 74 at the end thereof by means of which the disc 58 may be manually rotated to a selected angular position. The lug 74 is also engageable by the screw 72 to limit rotation of the disc 58.

In the position shown, the disc 58 is in its extreme counterclockwise position wherein the lug 74 engages the screws 72. In this position of the disc 58 and lug 66, the dial 46 may be rotated counterclockwise until the opening 32 is aligned with the passage 14. In this last said position of the dial 46, the capacity of the cock 32 will be maximum thereby permitting maximum fuel flow to the burner.

Should the disc 58 be rotated clockwise, it will be apparent that abutment 68 in the dial 46 will engage the stop 66 before the opening 32 is completely aligned with the passage 14 thereby reducing the capacity of the cock 28. Thus, by manually adjusting the disc 58, the capacity of the cock 28 in the full "on" position of the dial 46 is adjusted. By means of the screw 72, the disc 58 may be clamped in any selected position.

*Thermostatic valve*

Referring to Fig. 1, a disc-shaped valve member 76, which may be of any suitable form, is positioned in the valve chamber 20 and is cooperable with a valve seat 78 to control the flow of fuel through the chamber 20. The valve member 76 is biased toward the valve seat 78 by a spring 80 which is mounted in compression between the valve 76 and a plate 82 secured to casing 10. A valve stem 84 is suitably connected to the valve member 76 and projects through a bushing 86 formed in the casing 10 to extend into engagement with a snap acting mechanism 88 of a type well known in the art. An operating button 90 of the snap acting mechanism 88 abuts a suitable projection 92 formed in an end of an operating lever 94.

The other end of the operating lever 94 engages an adjustment means later to be described.

Thermally responsive actuating means is provided for actuating the snap action mechanism 88 and includes a thermal element of the rod and tube type with a tube 96 of expansible material secured to the casing 10 by a bracket 98, and a rod 100 of relatively non-expansible material extending into the casing 10 and being free to move relative thereto. The free end of the rod 100 is in engagement with a recess 102 formed in the operating lever 94 in the central portion thereof.

An operating shaft 104 engages a recess 106 at the lower end of the operating lever 94 which defines a pivoting point therefor. A sleeve 108 extends across the passage 22 and has one end thereof press-fitted and sealed within a bore in the casing 10, the other end thereof having a flange portion 110 abutting a gasket 112 to provide an effective seal. Thus, the hollow interior of the sleeve 108 is sealed from the passage 22. The operating shaft 104 extends from the recess 106 through the sleeve 108 and has the opposite end thereof engaging an adjusting screw 114 which is threaded within a bushing 116. The bushing 116 is also threaded within the casing 10 and holds the flange portion 110 into engagement with the gasket 112.

The thermostatic valve means thus far described operate in a manner well known to those skilled in the art. It will be apparent that rotation of the adjusting screw 114 relative to the casing 10 will effect axial movement thereof to adjust the pivoting point of the lever 94 through a range of positions. The temperature at which the rod and tube thermal element 96, 100 will cause actuation of the snap acting mechanism 88 and the valve 76 will be determined by the position of the lever 94.

To enable manual adjustment of the screw 114, one end thereof projects from the casing 10. A flange 118 having a tapered seating surface on the periphery thereof is formed on the screw 114 intermediate the ends thereof. A stop member 120 is seated on the said seating surface and is clamped thereto by means of a bushing 122 which is threaded on the projecting end of the screw 114 and has the flanged end thereof engaging the end of the stop 120.

A manually operable dial 124 is provided with an axial bore 125 in which the stop 120 is positioned. The dial 124 is positioned in axial alignment with the screw 114 and is keyed to stop 120 for rotation therewith by means of a lug 126 projecting from the stop 120 for cooperation with the complemental slot in the dial 124. A pin 128 projects from the casing 10 and is engageable by the opposite sides of the abutment 126 to thereby limit clockwise and counterclockwise rotation of the dial 124.

To hold the dial 124 on the stop 120, a screw 132 is threaded in the bushing 122 and has the head thereof closing the end of the bore 125 in the dial 124. A spring 134 is positioned within the bore 125 and mounted in compression between a shoulder of the bore 125 and the head of the screw 132. The spring 134 exerts a biasing force on the dial 124 which normally tends to maintain axial alignment of the dial 124 with the screw 114 and biases the dial 124 into engagement with abutment means now to be described.

As shown in Fig. 2, the plate 82 is provided with a plurality of integral projections 135 (in this instance 3) which are angularly spaced from the center of rotation of the dial 124 and are engaged by the underside of the rim of the dial 124. The dial 124 engages the projections 135 during rotation thereof under the bias of the spring 134. It will be apparent that the projections 135 will prevent pivoting of the dial 124 and damage to the adjusting screw 114 as a result of accidental blows or forces applied to the dial 124. It will also be apparent that the friction developed between the dial 124 and the projections 135 prevents accidental rotation of the dial 124.

Furthermore, the yieldable mounting of the dial 124 by means of the spring 134 permits the assembly comprising the adjusting screw 114, stop 120, bushing 122, and screw 132 to move axially relative to the casing 10 independently of the dial 124.

To further protect the adjustment means from damage, the plate 82 is provided with a tapered shield 136 which is positioned in axial alignment with the dial 124 and substantially encloses the periphery thereof, shielding the same from lateral blows or forces.

To calibrate the thermostatic valve, it is only necessary to remove the screw 132 whereupon the dial 124 may be removed from the stop 120. The bushing 122 may then be loosened to permit rotation of the stop 120 on the flange 118 relative to the screw 114. Such positioning of the stop 120 will vary the axial positions of the screw 114 at which lug 126 will engage the opposite sides of the pin 128 and thereby vary the range of temperature settings through which the dial is positioned.

*Operation*

To place the control device in an operative condition, the dial 46 is rotated counterclockwise until abutment 68 engages the stop 66, and the dial 124 is rotated clockwise to a selected temperature setting. If the capacity of the shut-off cock 28 exceeds that of the burner, the screw 72 may be loosened and the disc 58 rotated clockwise to decrease the capacity of the cock 28 at the position where abutment 68 engages the stop 66. Re-tightening of the screw 72 will clamp the disc 58 in the last said position to thereby limit rotation of the dial 46 and provide a full "on" positoin of the cock 28 at this reduced capacity. If the capacity of the burner exceeds the capacity of the cock 28, the disc 58 may be rotated counterclockwise to increase the capacity of the cock 28 in the "on" position thereof.

It will be apparent that the operation of the disc 58 provides a simple economical means for adjusting the capacity of the cock in the "on" position thereof.

Also, it will be apparent that the particular mounting of the dial 124 substantially eliminates damage to the temperature adjustment means for the thermostatic valve as a result of accidental blows or forces applied to the dial 124.

While only one embodiment of the invention has been herein shown and described, it will be apparent to those skilled in the art that many variations in the construction and arrangement of parts may be made without departing from the scope of the invention as defined in the appended claims.

It is claimed and desired to secure by Letters Patent:

1. In a control device, the combination comprising a casing, a control member in said casing movable between controlling positions, a bushing threaded in said casing, a rotatable shaft having one end threaded in said bushing and movable axially upon rotation thereof to actuate said control member between said positions, the other end of said shaft projecting exteriorly of said casing, a rotatable stop seated on said shaft intermediate the ends thereof and rotatable relative thereto, a second bushing threaded on said other end of said shaft and operative to normally clamp said stop to said shaft for rotation therewith, a manually operable dial seated on said stop for rotation therewith, and a screw threaded in the end of said second bushing for clamping said dial to said stop.

2. A control device as claimed in claim 1 wherein a spring is mounted in compression between said screw and said dial.

3. A control device as claimed in claim 1 wherein said shaft is provided with a tapered shoulder intermediate its ends thereof and said stop is provided with a tapered seat for engagement with said shoulder.

4. A control device as claimed in claim 1 wherein said stop is movable relative to said shaft for calibrating the position of said dial in relation to said control member.

5. In a control device, a casing member having a projection thereon, a control member in said casing movable between controlling positions, adjusting means rotatably mounted in said casing and operable for causing actuation of said control member between said positions, said adjusting means projecting exteriorly of said casing and having an abutment thereon, a stop member seated on said abutment and being cooperable with said projection for limiting rotation of said adjusting means, clamping means carried by the projecting end of said adjusting means for releasably securing said stop member in predetermined position, said clamping means having an enlargement formed thereon, a manually operable member slidably but non-rotatably mounted on said stop member for rotating said adjusting means, said manually operable member having a recess for receiving said enlargement and being cooperable therewith for forming opposite walls of a chamber, and yieldable means in said chamber and operable between said opposite walls for biasing said manually operable member axially toward said casing.

6. In a control device as claimed in claim 5 wherein one of said manually operable and casing members is provided with a planar face and the other said member with a plurality of projections, said yieldable means biasing said manually operable member sufficiently to cause slip frictional engagement between said face and said projections.

References Cited in the file of this patent

UNITED STATES PATENTS

| | | |
|---|---|---|
| 1,104,918 | Mouat | July 28, 1914 |
| 2,069,017 | Pratt | Jan. 26, 1937 |
| 2,412,235 | Van Denberg et al. | Dec. 10, 1946 |
| 2,561,482 | Schostak | July 24, 1951 |
| 2,650,028 | Grayson | Aug. 25, 1953 |
| 2,650,766 | Broun et al. | Sept. 1, 1953 |
| 2,672,272 | Caparone et al. | Mar. 16, 1954 |
| 2,695,056 | Caparone et al. | Nov. 23, 1954 |
| 2,704,466 | Way | Mar. 22, 1955 |
| 2,766,961 | Meusy | Oct. 16, 1956 |